(12) United States Patent
Kitayama

(10) Patent No.: US 11,067,873 B2
(45) Date of Patent: Jul. 20, 2021

(54) IMAGE STABILIZATION APPARATUS, LENS APPARATUS AND CAMERA SYSTEM HAVING THE SAME

(71) Applicant: CANON KABUSHIKI KAISHA, Tokyo (JP)

(72) Inventor: Toma Kitayama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 16/384,182

(22) Filed: Apr. 15, 2019

(65) Prior Publication Data

US 2019/0317381 A1 Oct. 17, 2019

(30) Foreign Application Priority Data

Apr. 17, 2018 (JP) .............................. JP2018-079234

(51) Int. Cl.
*G02B 27/64* (2006.01)
*G03B 5/00* (2021.01)

(52) U.S. Cl.
CPC ............. *G03B 5/00* (2013.01); *G02B 27/646* (2013.01); *G03B 2205/0015* (2013.01); *G03B 2205/0069* (2013.01)

(58) Field of Classification Search
CPC .. G02B 27/64; G02B 27/646; H04N 5/23248; H04N 5/23264; H04N 5/2328; H04N 5/23287; G03B 2217/005; G03B 2205/00; G03B 2205/0007; G03B 2205/0015;
(Continued)

(56) References Cited

U.S. PATENT DOCUMENTS 8,086,097 B2 12/2011 Sato
8,218,958 B2 7/2012 Sato
(Continued)

FOREIGN PATENT DOCUMENTS

CN 101231444 A 7/2008
CN 102165367 A 8/2011
(Continued)

OTHER PUBLICATIONS

Notification of the First Office Action issued by the China National Intellectual Property Administration dated Apr. 27, 2021 in corresponding CN Patent Application No. 201910291362.3, with English translation.

*Primary Examiner* — Arnel C Lavarias
(74) *Attorney, Agent, or Firm* — Carter, DeLuca & Farrell LLP

(57) ABSTRACT

An image stabilization apparatus includes a fixed member, a lens, a movable member, a guide member, and first to third rolling members. At least one of the fixed member, the movable member, and the guide member includes a movement restrictor configured to restrict a moving range of a restricted rolling member as at least one of the first to third rolling members in a predetermined direction on the plane perpendicular to the optical axis. The movement restrictor is formed such that as the restricted rolling member approaches to an end portion of the moving range, a center of the restricted rolling member approaches to a centerline in a width direction perpendicular to the predetermined direction of the movement restrictor.

9 Claims, 8 Drawing Sheets

(58) Field of Classification Search
CPC .... G03B 2205/0053; G03B 2205/0061; G03B 2205/0069; G03B 2205/0084
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | |
|---|---|---|---|
| 8,928,977 B2 * | 1/2015 | Yasuda | G03B 5/00 359/557 |
| 9,057,883 B2 * | 6/2015 | Yasuda | G02B 27/646 |
| 10,768,436 B2 * | 9/2020 | Nagaoka | H02K 41/0356 |
| 2011/0013283 A1 | 1/2011 | Sato | |
| 2020/0073202 A1 * | 3/2020 | Noguchi | H04N 5/2254 |
| 2020/0363647 A1 * | 11/2020 | Noda | G02B 7/08 |

FOREIGN PATENT DOCUMENTS

| | | |
|---|---|---|
| CN | 105278208 A | 1/2016 |
| CN | 105446053 A | 3/2016 |
| CN | 105573013 A | 5/2016 |
| JP | 2008304850 A | 12/2008 |
| JP | 2011022250 A | 2/2011 |
| JP | 2011158924 A | 8/2011 |
| JP | 4804564 B2 | 11/2011 |
| JP | 2013092563 A | 5/2013 |
| JP | 5383743 B2 | 1/2014 |
| JP | 2014077920 A | 5/2014 |

* cited by examiner

IMAGE STABILIZATION APPARATUS, LENS APPARATUS AND CAMERA SYSTEM HAVING THE SAME

BACKGROUND OF THE INVENTION

Field of the Invention

The present invention relates to an image stabilization apparatus, a lens apparatus and a camera system having the same.

Description of the Related Art

One conventional image stabilization apparatus suppresses an image blur by translating part of a lens unit on a plane perpendicular to an optical axis in an imaging apparatus. For improved controllability, a rotation preventive mechanism is proposed that prevents a movable lens frame from rotating around the optical axis relative to a fixed lens frame in the configuration of the image stabilization apparatus. Each of Japanese Patents Nos. 4804564 and 5383743 discloses an image stabilization apparatus having a rotation preventive mechanism using a guide member that holds a rolling ball between a movable member and a fixed member.

However, the image stabilization apparatus disclosed in each of Japanese Patents Nos. 4804564 and 5383743 has a circular movable range of the rolling ball held between the guide member and the fixed member and movable only in one predetermined direction within the plane perpendicular to the optical axis. Since the width in the direction perpendicular to the movable direction is larger than necessary, the image stabilization unit is prevented from being made smaller. On the other hand, when the width in the direction perpendicular to the movable direction is reduced, the rolling ball is likely to contact a wall surface portion that restricts the movable range of the rolling ball, and may deteriorate the characteristic of the unit.

SUMMARY OF THE INVENTION

The present invention provides an image stabilization apparatus, a lens apparatus, and a camera system having the same, which has a smaller configuration and improved operational stability.

An image stabilization apparatus according to one aspect of the present invention includes a fixed member, a lens, a movable member configured to hold the lens and movable relative to the fixed member on a plane perpendicular to an optical axis of the lens, a guide member movable relative to the fixed member on the plane perpendicular to the optical axis and configured to guide the movable member while suppressing the movable member from rotating relative to the fixed member on the plane perpendicular to the optical axis, a first rolling member held and configured to roll between the fixed member and the guide member, a second rolling member held and configured to roll between the guide member and the movable member, and a third rolling member held and configured to roll between the fixed member and the movable member. At least one of the fixed member, the movable member, and the guide member includes a movement restrictor configured to restrict a moving range of a restricted rolling member as at least one of the first to third rolling members in a predetermined direction on the plane perpendicular to the optical axis. The movement restrictor is formed such that as the restricted rolling member approaches to an end portion of the moving range, a center of the restricted rolling member approaches to a centerline in a width direction perpendicular to the predetermined direction of the movement restrictor.

A lens apparatus having the above image stabilization apparatus, and a camera system having the above image stabilization apparatus and an image sensor configured to photoelectrically convert an object image formed by the lens apparatus constitute other aspects of the present invention.

Further features of the present invention will become apparent from the following description of exemplary embodiments with reference to the attached drawings.

DESCRIPTION OF THE EMBODIMENTS

Figure 1:
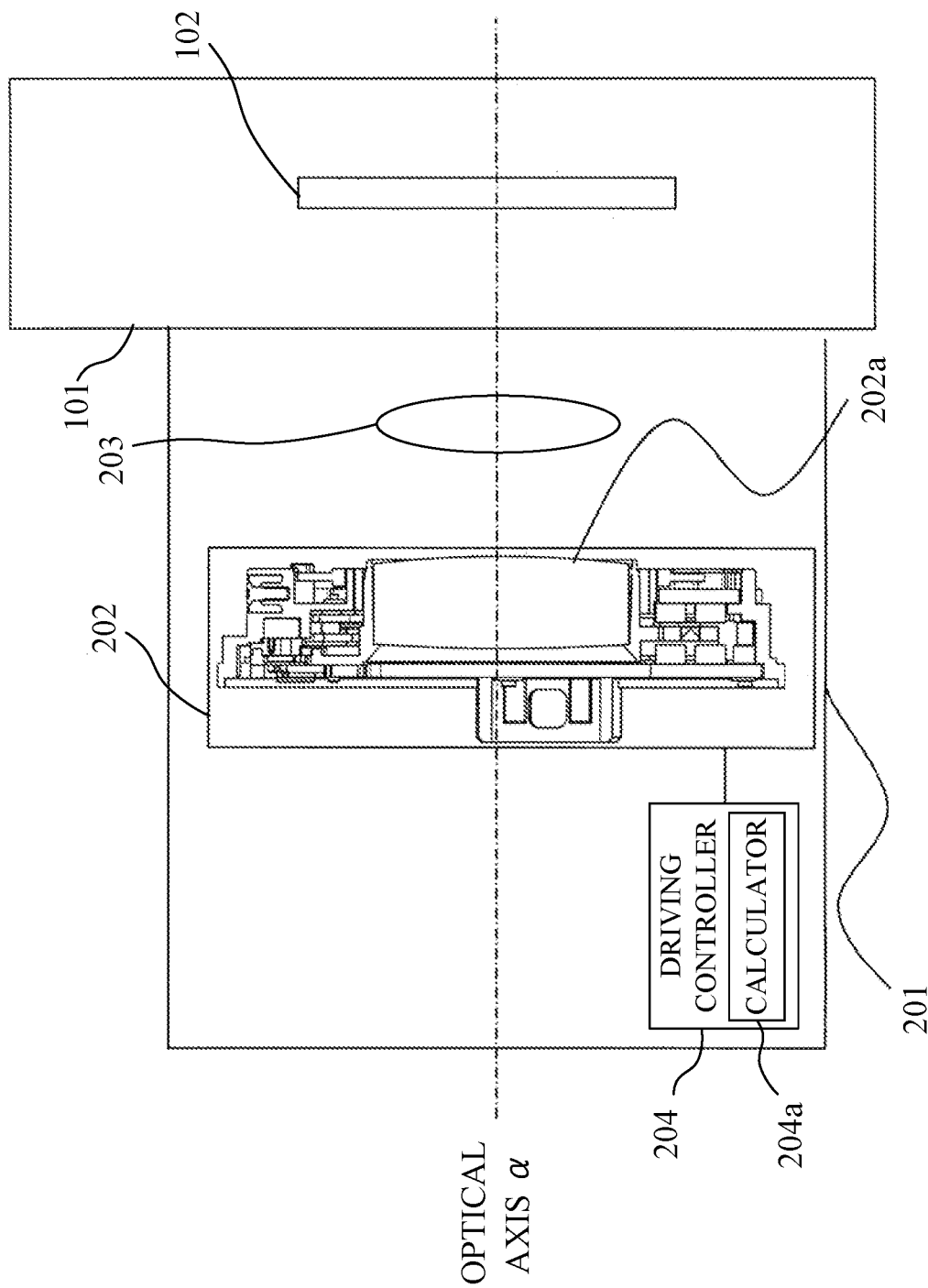
FIG. 1 illustrates a configuration of a camera system according to one embodiment of the present invention.

Referring now to the accompanying drawings, a detailed description will be given of embodiments according to the present invention. Corresponding elements in respective figures will be designated by the same reference numerals, and a duplicate description will be omitted.

FIG. 1 illustrates a configuration of a digital still camera as an illustrative camera system 1 according to one embodiment of the present invention. The camera system 1 includes an imaging apparatus 101 and a lens barrel (lens apparatus) 201. The lens barrel 201 may be integrated with or detachably attached to the imaging apparatus 101.

The imaging apparatus 101 includes an image sensor 102 that photoelectrically converts an object image formed via the lens barrel 201. A CCD image sensor, a CMOS image sensor, or the like is mainly used as the image sensor 102.

The lens barrel 201 has an image stabilization unit (image stabilization apparatus) 202 that includes a correction lens 202a, a movable lens 203 movable along an optical axis α, and a driving controller 204 including a calculator 204a. The image stabilization unit 202 corrects an image blur by moving the correction lens 202a on a plane perpendicular to the optical axis α. In FIG. 1, the correction lens 202a is located at the center position (reference position) of the optical axis α. The movable lens 203 includes at least one of a zoom lens and a focus lens. The driving controller 204 controls driving of the correction lens 202a based on a driving amount of the correction lens 202a calculated by the calculator 204a. In addition to the correction lens 202a and the movable lens 203, the lens barrel 201 includes an unillustrated lens unit that forms an imaging optical system.

Figure 2:
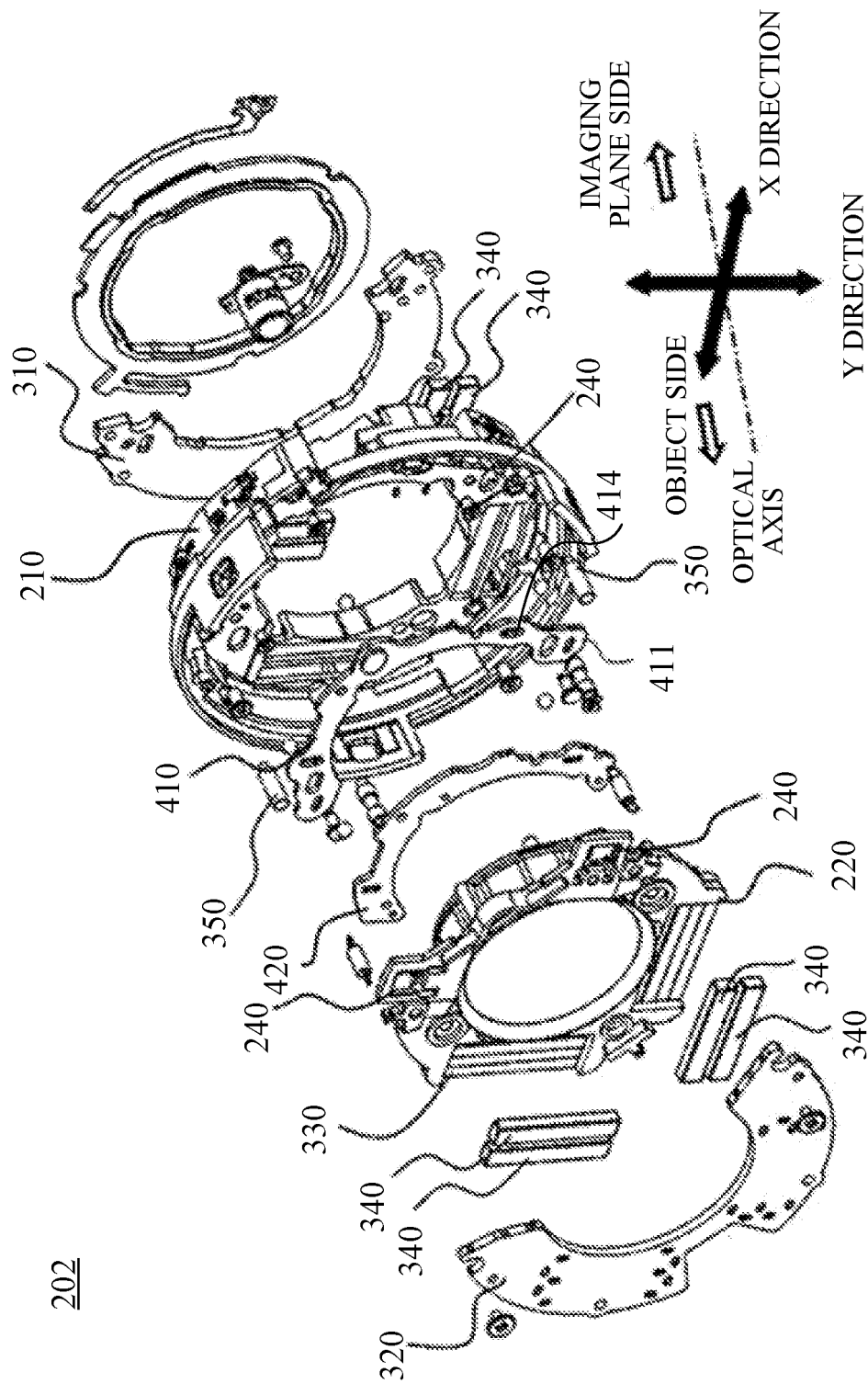
FIG. 2 is an exploded perspective view of an image stabilization unit viewed from an object side.
Figure 3:
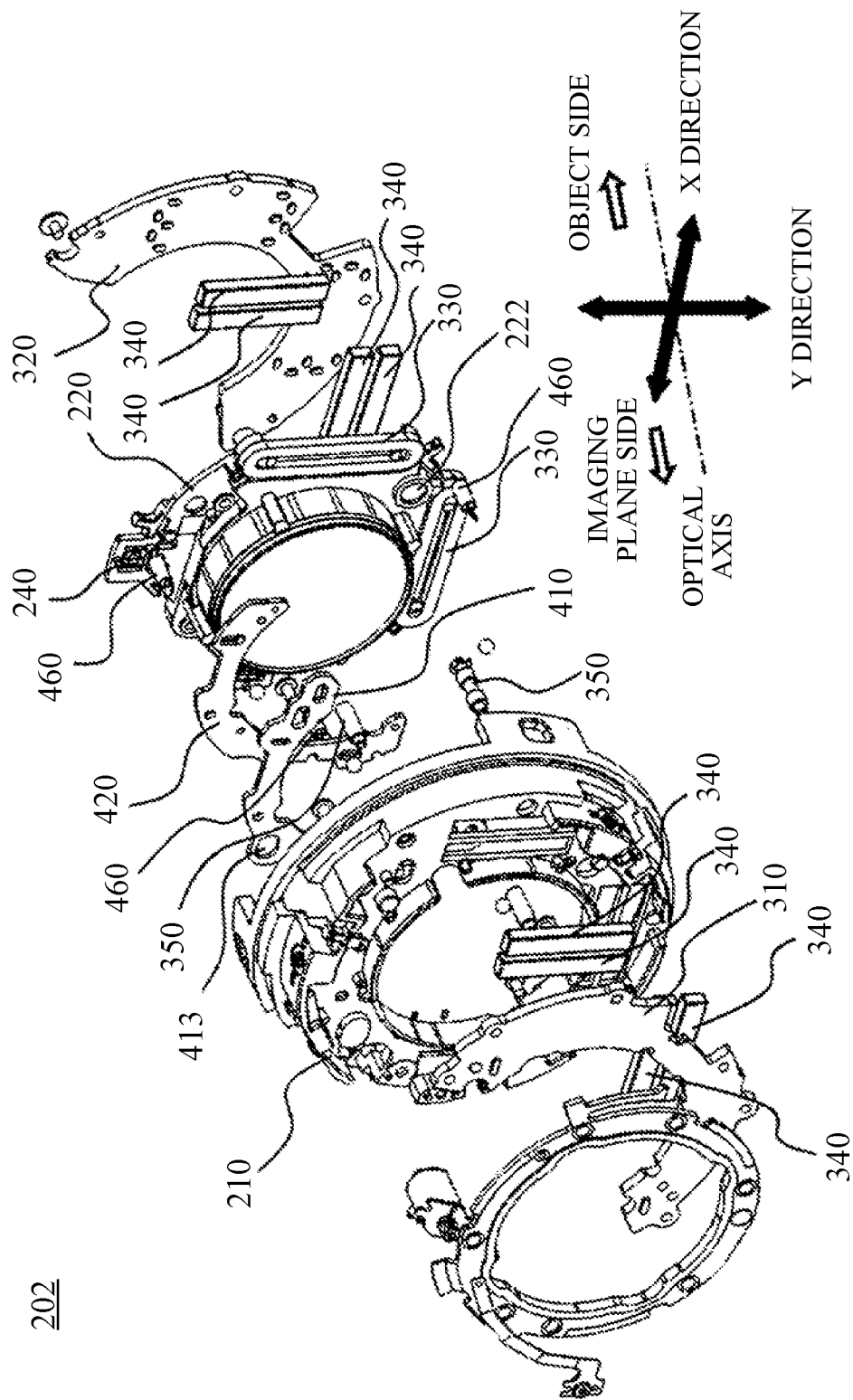
FIG. 3 is an exploded perspective view of the image stabilization unit viewed from an imaging plane side.

Referring now to FIGS. 2 and 3, a description will be given of the driving principle and configuration of the image stabilization unit 202. FIG. 2 is an exploded perspective view of the image stabilization unit 202 viewed from the object side. FIG. 3 is an exploded perspective view of the image stabilization unit 202 viewed from the imaging plane side of the image sensor 102.

A movable lens frame (movable member) 220 is a frame member configured to hold the correction lens 202a. A fixed lens frame (fixed member) 210 is fixed to the lens barrel 201 in a direction perpendicular to the optical axis. A driving unit includes a first yoke 310, a second yoke 320, a shift coil 330, and a shift magnet 340. The first yoke 310 and the second yoke 320 are fixed on the fixed lens frame 210. The second yoke 320 is disposed opposite to the first yoke 310 with respect to the movable lens frame 220. Two shift coils 330 are fixed onto the movable lens frame 220. The two shift coils 330 are located at positions that are distant from the optical axis center by the same amount and form an angle of 90° with respect to the optical axis center. The shift magnet 340 is disposed on the first yoke 310. The shift magnets 340 are arranged two each at two positions overlapping the shift coil 330 viewed from the optical axis direction. The two positions are separated from the optical axis center by the same amount. The shift magnet 340 is also disposed on the second yoke 320. The shift magnets 340 are arranged two each at two positions overlapping the shift coil 330 viewed from the optical axis direction. The two positions are separated from the optical axis center by the same amount.

A closed magnetic circuit is formed by the first yoke 310, the second yoke 320, and the shift magnet 340, and the first yoke 310 and the second yoke 320 are attracted to each other by the magnetic attraction force. A shaft 350 is disposed between the first yoke 310 and the second yoke 320, and prevents each yoke and the fixed lens frame 210 from being deformed by the magnetic attraction force. When the shift coil 330 is energized in the magnetic circuit, the movable lens frame 220 moves in the X and Y directions by the electromagnetic interaction between the coil and the magnet. Thus, the movable lens frame 220 can move in the X and Y direction on the plane perpendicular to the optical axis relative to the fixed lens frame 210.

A position detector 240 detects a moving amount of the movable lens frame 220 relative to the fixed lens frame 210. The position detector 240 may use, for example, a Hall element utilizing a Hall effect or the like. In this embodiment, the movable lens frame 220 has a Hall sensor as a detector, and the fixed lens frame 210 has a Hall magnet as a detected portion. The position detectors 240 are located at positions that are separated from the optical axis center by the same amount and form 90° with respect to the optical axis center.

Figure 4:
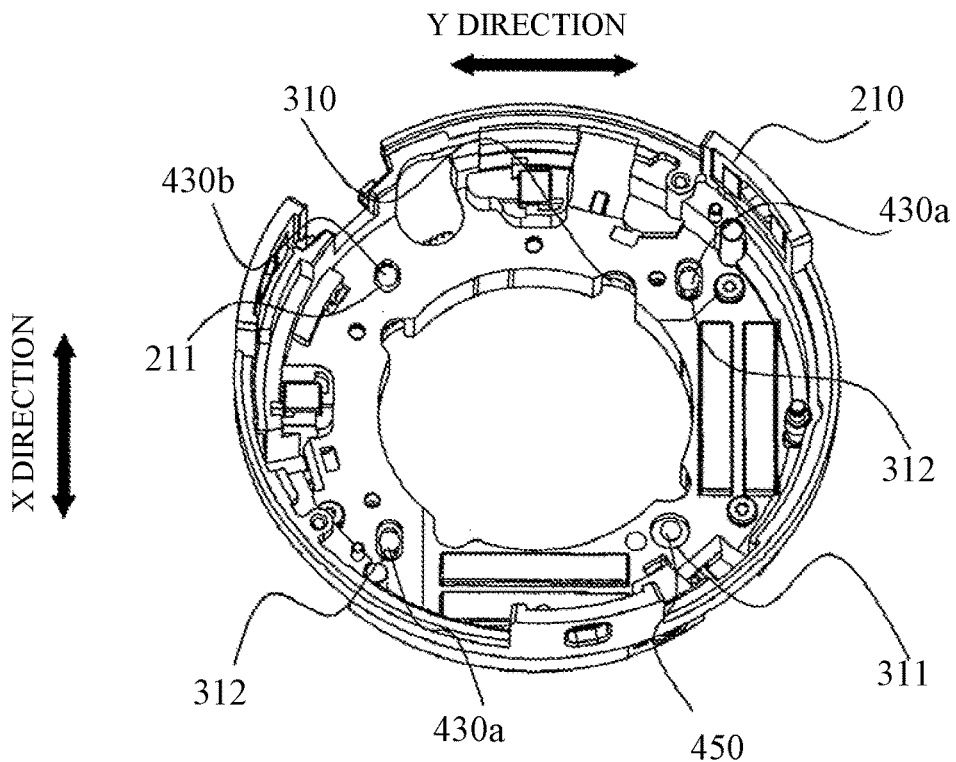
FIG. 4 illustrates a first yoke attached to a fixed lens frame and viewed from the object side.
Figure 5:
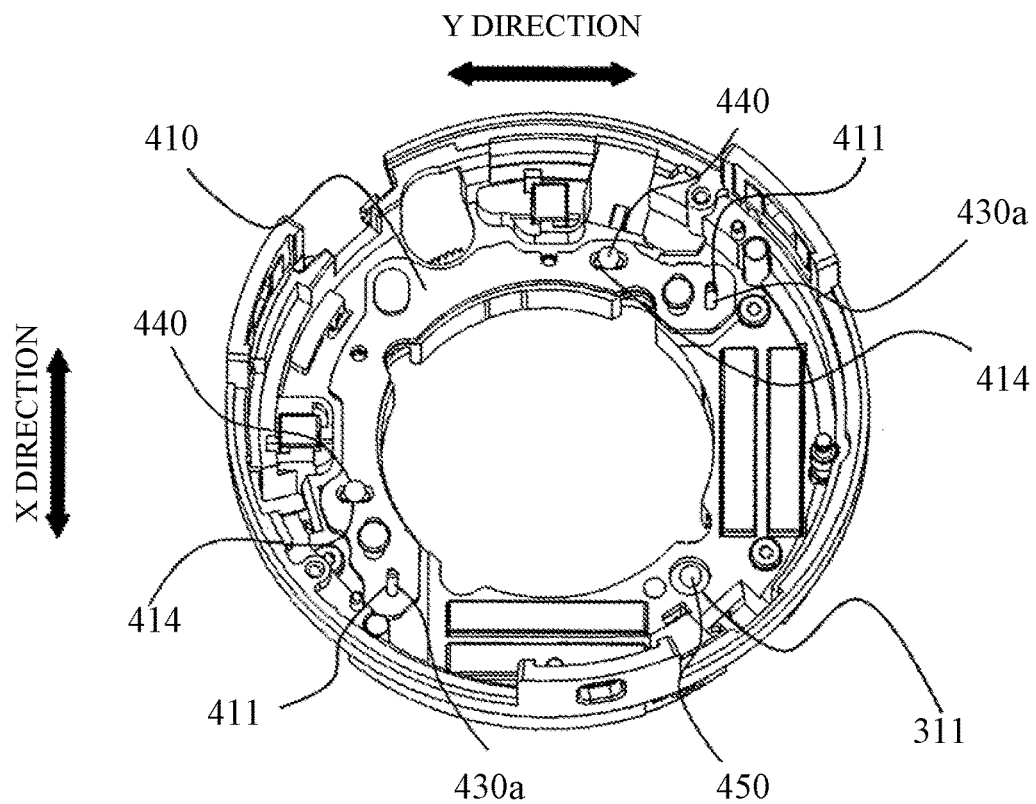
FIG. 5 illustrates a first anti-roll plate attached to the unit in FIG. 4 and viewed from the object side.
Figure 6:
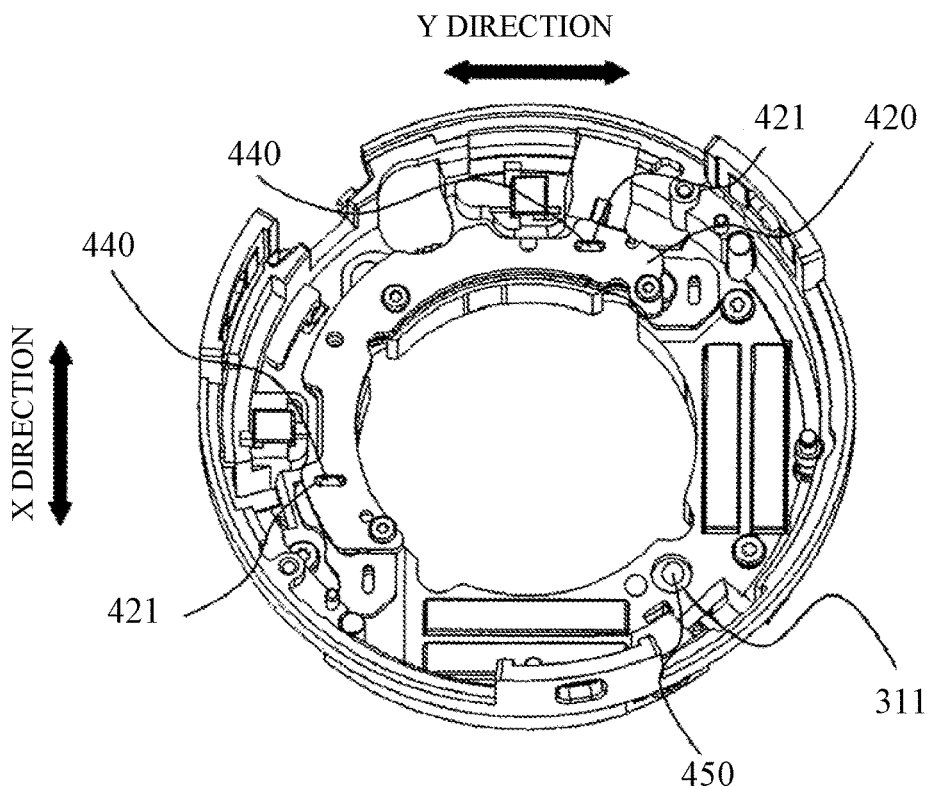
FIG. 6 illustrates a second anti-roll plate attached to the unit in FIG. 5 and viewed from the object side.

Referring now to FIG. 4 to FIG. 6, a description will be given of a rotation preventive mechanism of the image stabilization unit 202. FIG. 4 illustrates the first yoke 310 attached to the fixed lens frame 210 and viewed from the object side. FIG. 5 illustrates a first anti-roll plate 410 attached to the unit in FIG. 4 and viewed from the object side. FIG. 6 illustrates a second anti-roll plate 420 attached to the unit in FIG. 5 and viewed from the object side.

The first yoke 310 includes a rolling ball contacting portion 311 and a rolling ball contacting portion 312. The rolling ball contacting portion 312 has a guide groove shape formed by an elongate hole. As illustrated in FIG. 3, the movable lens frame 220 has a rolling ball contacting portion 222. The fixed lens frame 210 has a rolling ball contacting portion 211. A first rolling ball (first rolling member) 430, a second rolling ball (second rolling member) 440, and a third rolling ball (third rolling member) 450 are spherical members made, for example, of ceramic or the like. The first rolling ball 430 includes a first rolling ball 430a that contacts the two rolling ball contacting portions 312 and a first rolling ball 430b (restricted rolling member) that contacts the rolling ball contacting portion 211. The third rolling ball 450 contacts the rolling ball contacting portion 311.

The first anti-roll plate 410 includes a rolling ball contacting portion 411, a rolling ball contacting portion 413 illustrated in FIG. 3, and a rolling ball contacting portion 414. Each of the rolling ball contacting portion 411 and the rolling ball contacting portion 414 has a guide groove shape formed by an elongate hole. The two first rolling balls 430a contacting the rolling ball contacting portion 312 contact the rolling ball contacting portion 411. The first rolling ball 430b contacting the rolling ball contacting portion 211 contacts the rolling ball contacting portion 413. The two second rolling balls 440 contact the rolling ball contacting portion 414. The longitudinal direction of the rolling ball contacting portion 411 coincides with the X direction, and the first anti-roll plate 410 can move only in the X direction relative to the fixed lens frame 210.

The second anti-roll plate 420 includes a rolling ball contacting portion 421. The rolling ball contacting portion 421 has a guide groove shape formed by an elongate hole. The rolling ball contacting portion 421 is provided such that its longitudinal direction is orthogonal to the longitudinal direction of the rolling ball contacting portion 411. The two second rolling balls 440 contact the rolling ball contacting portion 421. The longitudinal direction of the rolling ball contacting portion 421 coincides with the Y direction, and the second anti-roll plate 420 can move only in the Y direction relative to the first anti-roll plate 410.

The movable lens frame 220 is fixed onto the second anti-roll plate 420 by screws or the like. The third rolling ball 450 contacting the rolling ball contacting portion 311 contacts the rolling ball contacting portion 222. Thus, the movable lens frame 220 is supported by three rolling balls.

The above configuration enables the movable lens frame 220 to move only in the first direction (X direction) and the second direction (Y direction) on the plane perpendicular to the optical axis without rotating relative to the fixed lens frame 210. Suppressing the rotation of the movable lens frame 220 can prevent erroneous detections by the position detector 240.

This embodiment makes the first direction and the second direction perpendicular to each other, but the present invention is not limited to this embodiment. The first direction and the second direction may be predetermined directions different from each other on the plane perpendicular to the optical axis.

Figure 7:
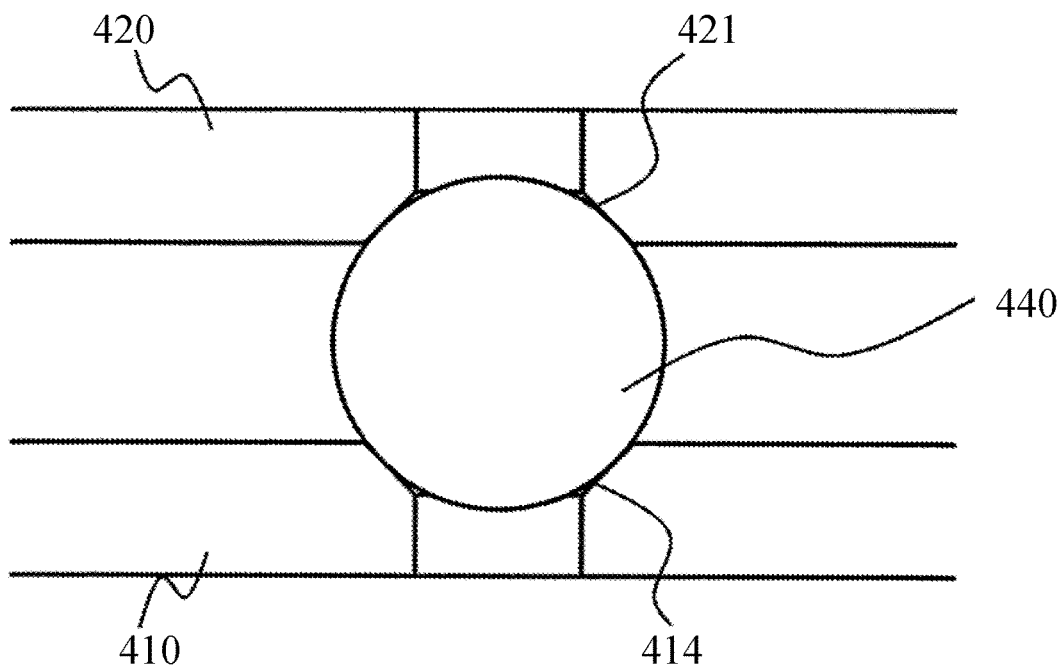
FIG. 7 is a sectional view of a second rolling ball contacting a rolling ball contacting portion.

Referring now to FIG. 7, a description will be given of the configuration of the anti-roll plate and the rolling ball. FIG. 7 is a sectional view taken along a plane perpendicular to the longitudinal directions of the rolling ball contacting portion 414 and the rolling ball contacting portion 421 passing through the center position of the second rolling ball 440, illustrating the second rolling ball 440 contacting the rolling ball contacting portion 414 and the rolling ball contacting portion 421.

Each of the rolling ball contacting portion 414 and the rolling ball contacting portion 421 has a plane that forms 45° with the plane perpendicular to the optical axis α which the second rolling ball 440 contacts. The movable lens frame 220 is integrated with the second anti-roll plate 420, and its three points are biased by forces pulling toward the fixed lens frame 210 side (imaging plane side) by the coil springs 460. This biasing force biases the first anti-roll plate 410 and the second anti-roll plate 420 in the direction of approaching to the first yoke 320 in the optical axis direction, so that the rolling ball is prevented from floating from the contacting portion. A rolling ball contacting another contacting portion can also steadily roll due to the same configuration. Thus, the movable lens frame 220 can move on the plane perpendicular to the optical axis without rotating on the plane perpendicular to the optical axis.

Figure 8:
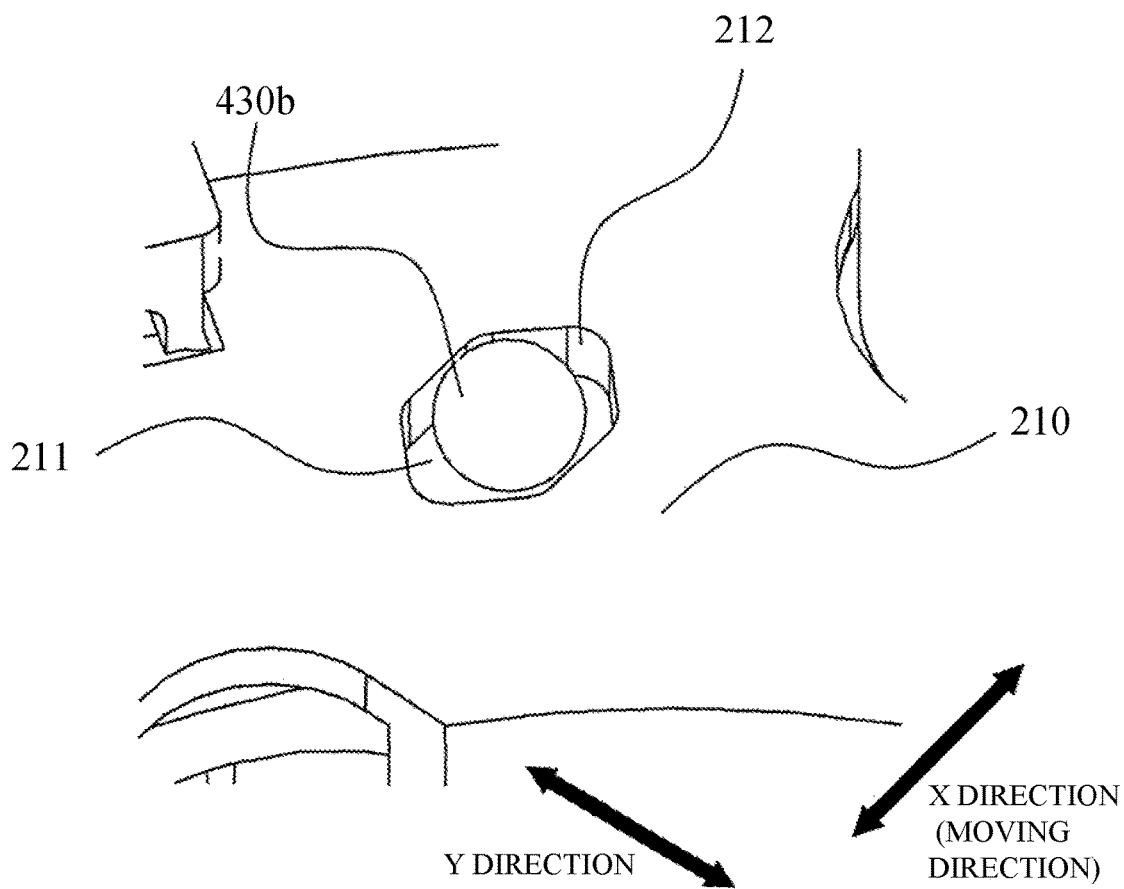
FIG. 8 is an enlarged view around the rolling ball contacting portion.
Figures 9A, 9B:
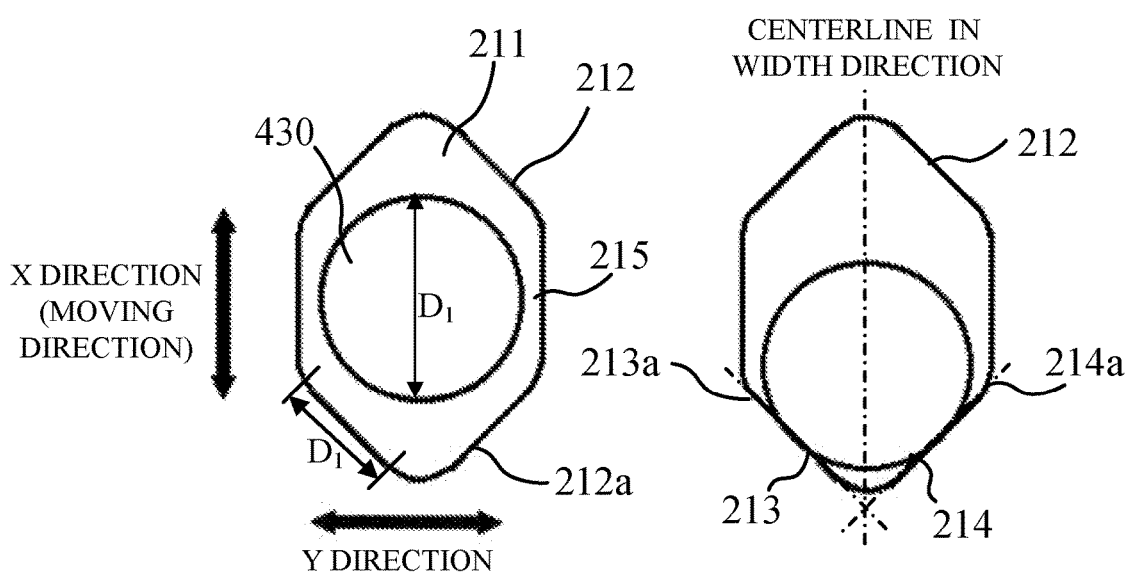
FIGS. 9A and 9B illustrate the rolling ball contacting portion viewed from the object side.
Figure 10:
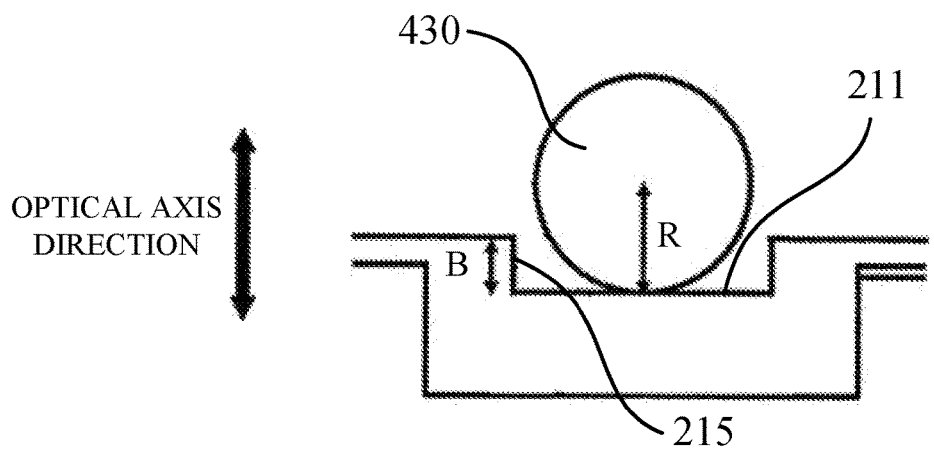
FIG. 10 is a sectional view of the rolling ball contacting portion taken along a plane perpendicular to a moving direction of the first rolling ball.

Referring now to FIG. 8 to FIG. 10, a description will be given of the movement restricting structure of the rolling ball. FIG. 8 is an enlarged view around the rolling ball contacting portion 211. FIGS. 9A and 9B illustrate the rolling ball contacting portion 211 viewed from the object side. FIG. 10 is a sectional view of the rolling ball contacting portion 211 taken along a plane perpendicular to the moving direction of the first rolling ball 430b.

The first rolling ball 430b rolls between the fixed lens frame 210 and the first anti-roll plate 410. As described above, since the first anti-roll plate 410 can move only in the X direction relative to the fixed lens frame 210, the first rolling ball 430b can also move only in the X direction.

The fixed lens frame 210 has a movement restrictor 212 as a wall surface perpendicular to the rolling ball contacting portion (first surface) 211. A moving range of the first rolling ball 430b is restricted by the shape of the movement restrictor 212. The movement restrictor 212 requires a sufficient length in the X direction as the moving direction of the first rolling ball 430b, but the movement restrictor 212 may have a length in the Y direction shorter than the length in the X direction, which is a width direction perpendicular to the moving direction of the first rolling ball 430b. Thus, in comparison with the conventionally circular restriction shape, the shape according to this embodiment can reduce the area of the movement restrictor 212 and provide the effects of saving the space of the unit and of improving the layout freedom degree.

The first rolling ball 430b usually moves only in the X direction along the centerline in the width direction (Y direction) of the movement restrictor 212 illustrated in FIG. 9B. In other words, the first rolling ball 430b moves so that the center of the first rolling ball 430b follows the centerline in the width direction of the movement restrictor 212. However, the center of the first rolling ball 430b may shift from the centerline in the width direction of the movement restrictor 212 due to the impact or the like. When the first rolling ball 430b contacts the first wall surface portion (second surface) 215 in the width direction of the movement restrictor 212 while the image stabilization unit 202 is being driven, the characteristic of the image stabilization unit 202 may deteriorate.

This embodiment forms the movement restrictor 212 such that as it approaches to the end portion of the moving range of the first rolling ball 430b, the center of the first rolling ball 430b approaches to the centerline in the width direction of the movement restrictor 212. Therefore, even when the center of the first rolling ball 430b shifts from the centerline in the width direction of the movement restrictor 212, the first rolling ball 430b moves so that its center accords with the centerline in the width direction of the movement restrictor 212 at the end of the moving range.

Next follows a description of the shape of the specific movement restrictor 212. The movement restrictor 212 is formed so that the length in the Y direction is narrower as it approaches to the end portion in the moving range of the first rolling ball 430b. An equalizing portion 212a is provided to the end portion of the movement restrictor 212 and gives a reaction force in a direction different from the moving direction of the first rolling ball 430b to the first rolling ball 430b when the first rolling ball 430b contacts the end or the equalizing portion 212a. This embodiment provides a first slope portion 213 and a second slope portion 214 as the equalizing portion 212a. The end portion of the movement restrictor 212 has the first slope portion 213 and the second slope portion 214. The first slope portion 213 is formed along a first oblique line 213a that inclines by a first angle relative to the X direction. The second slope portion 214 is formed along a second oblique line 214a that includes by a second angle different from the first angle relative to the moving direction of the first rolling ball 430b. When the first rolling ball 430b contacts the first slope portion 213 or the second slope portion 214, the first slope portion 213 or the second slope portion 214 gives the first rolling ball 430b a reaction force in the direction different from the moving direction of the first rolling ball 430b.

The first slope portion 213 and the second slope portion 214 have lengths equal to each other on the plane perpendicular to the optical axis α, and the intersection point between the first oblique line 213a and the second oblique line 214a is located on the centerline the width direction of the movement restrictor 212. Assume that A (degrees) is an angle at which the first oblique line 213a intersects with the second oblique line 214a. Then, the following conditional expression (1) may be satisfied.

$$60 \leq A \leq 120 \quad (1)$$

When the angle A is larger than 120°, the length in the width direction of the movement restrictor 212 increases and the area of the movement restrictor 212 increases. Even when the first rolling ball 430b reaches the end portion of the moving range, the center may not move so as to coincide with the centerline in the width direction of the movement restriction portion 212. On the other hand, when the angle A is smaller than 60°, the length of the movement restrictor 212 in the X direction increases and the area of the movement restrictor 212 increases.

The angle A may satisfy the following conditional expression (2).

$$70 \leq A \leq 110 \quad (2)$$

Satisfying the conditional expression (2) can further reduce the area of the movement restrictor 212, and the rolling ball 430b can move such that the center of the movement restrictor 212 surely accords with the centerline in the width direction at the end portion of the moving range.

The angle A may be 90°.

Where D1 (mm) is the length of the first slope portion 213 or the second slope portion 214 on the plane perpendicular to the optical axis α and D2 (mm) is a diameter of the first rolling ball 430b, the following conditional expression (3) may be satisfied.

$$0.25 \leq D1/D2 < 1 \quad (3)$$

When the ratio D1/D2 is larger than 1, the length of the movement restrictor 212 in the X direction increases and the area of the movement restrictor 212 increases. On the other hand, when the ratio D1/D2 is smaller than 0.25, the first rolling ball 430b is likely to contact the first wall surface portion 215.

This embodiment satisfies D1=1 mm, D2=2 mm, and D1/D2=0.5.

As described above, the configuration of this embodiment moves the first rolling ball 430b so that its center coincides with the centerline of the movement restricting section 212 in the Y direction in the initial operation or the like of the image stabilization unit 202, improving the stability of the image stabilization unit 202.

This embodiment has described the shape of the first end portion in the moving direction of the first rolling ball 430b in the movement restrictor 212, but the second end portion has a similar shape.

The first wall surface portion 215 is formed so that a length B in the optical axis direction is shorter than a radius R of the first rolling ball 430b. Due to this configuration, as compared with the configuration in which the length B is longer than the radius R, the first rolling ball 430b is less likely to contact the wall surface portion 215 and the length (lateral width) in the width direction of the movement restrictor 212 can be made smaller.

Figure 11:
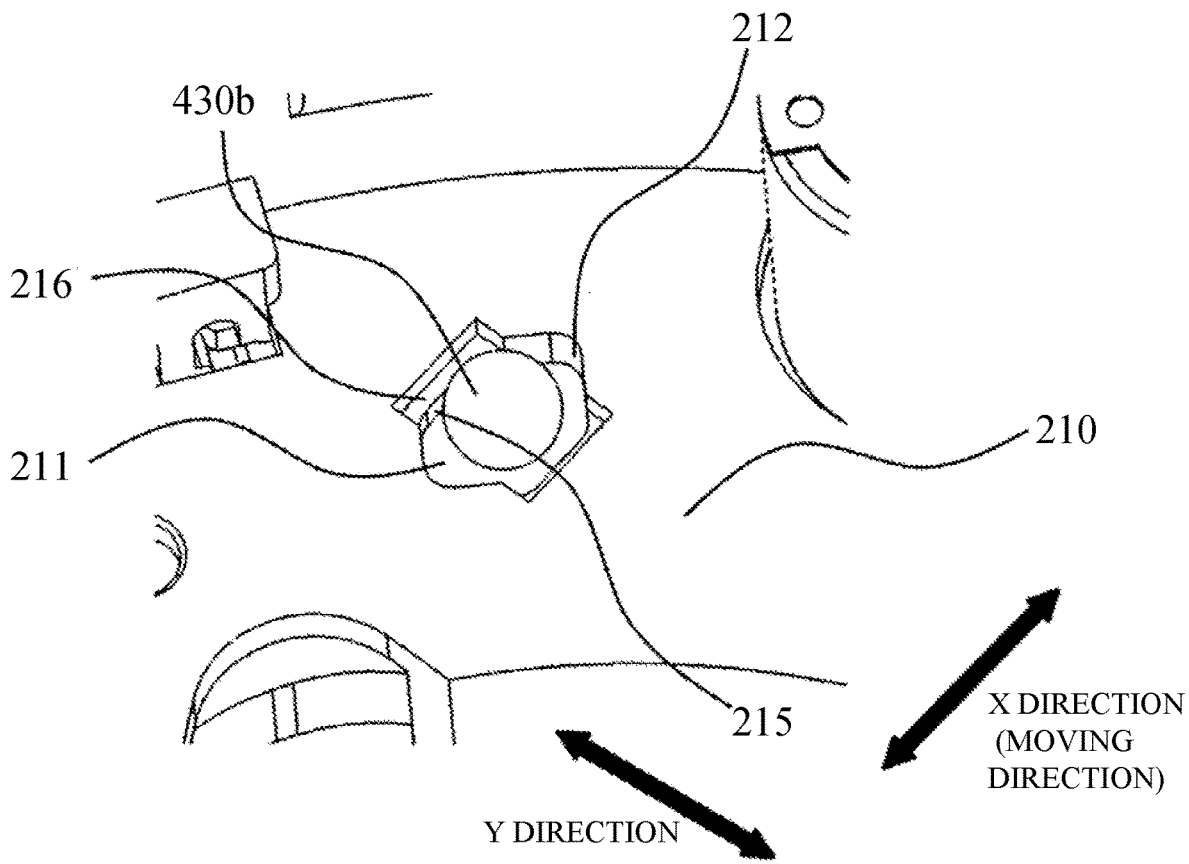
FIG. 11 is an enlarged view around the rolling ball contacting portion.
Figure 12:
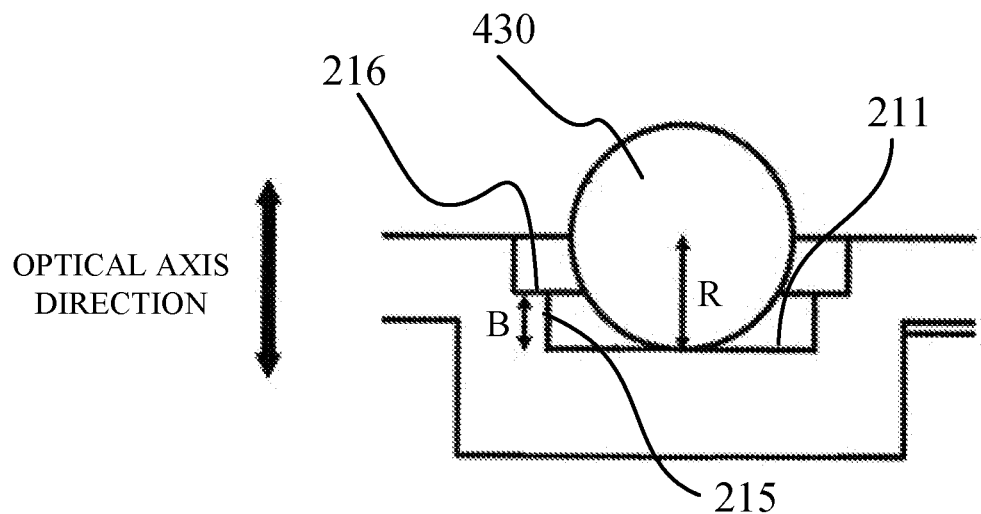
FIG. 12 is a sectional view of the rolling ball contacting portion taken along the plane perpendicular to the moving direction of the first rolling ball.
Figure 13:
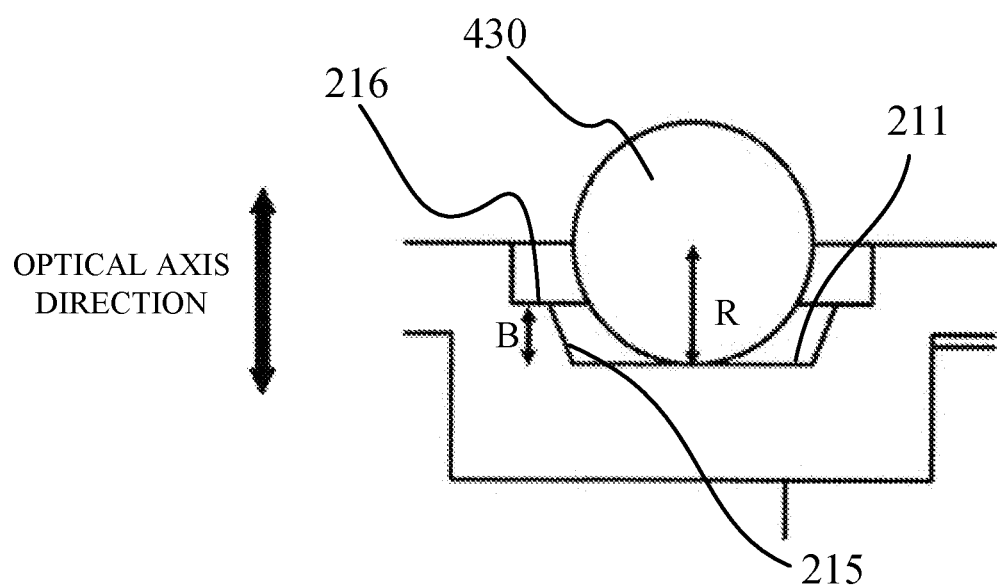
FIG. 13 is a sectional view of the rolling ball contacting portion taken along the plane perpendicular to the moving direction of the first rolling ball.

Referring now to FIGS. 11 to 13, a description will be given of a movement restrictor having a different structure from that in FIG. 8. FIG. 11 is an enlarged view around the rolling ball contacting portion 211. FIGS. 12 and 13 are sectional views of the rolling ball contacting portion 211 taken along the plane perpendicular to the moving direction of the first rolling ball 430b.

The second wall surface portion 216 has a surface parallel to the rolling ball contacting portion 211 and is connected to the rolling ball contacting portion 211 via the first wall surface portion 215. The first wall surface portion 215 is formed so that the length B of the first wall surface portion 215 in the optical axis direction is smaller than the radius R of the first rolling ball 430b. Due to this configuration, as compared with a configuration in which the length B is longer than the radius R, the first rolling ball 430b is less likely to contact the wall surface portion 215 and the length (width) in the Y direction of the movement restrictor 212 can be made smaller. The first wall surface portion 215 is not required to be parallel to the optical axis α, and may be configured to have a slope shape, as illustrated in FIG. 13.

This embodiment provides the movement restrictor to the fixed lens frame 210, but it may be provided to the movable lens frame 220 or the guide member (the first anti-roll plate 410 and the second anti-roll plate 420).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-079234, filed on Apr. 17, 2018, which is hereby incorporated by reference herein in its entirety.

What is claimed is:

1. An image stabilization apparatus comprising:
a fixed member;
a lens;
a movable member configured to hold the lens and capable of moving relative to the fixed member on a plane perpendicular to an optical axis of the lens;
a guide member movable relative to the fixed member on the plane perpendicular to the optical axis and configured to guide the movable member while suppressing the movable member from rotating relative to the fixed member on the plane perpendicular to the optical axis;
a first rolling member held and configured to roll between the fixed member and the guide member;
a second rolling member held and configured to roll between the guide member and the movable member; and
a third rolling member held and configured to roll between the fixed member and the movable member,
wherein at least one of the fixed member, the movable member, and the guide member includes a movement restrictor configured to restrict a moving range of a restricted rolling member as at least one of the first to third rolling members in a predetermined direction on the plane perpendicular to the optical axis, and
wherein the movement restrictor is formed such that as the restricted rolling member approaches to an end portion of the moving range, a center of the restricted rolling member approaches to a centerline in a width direction perpendicular to the predetermined direction of the movement restrictor.

2. The image stabilization apparatus according to claim 1, wherein the movement restrictor is formed with a length in the width direction that is narrower as the restricted rolling member approaches to the end portion of the moving range.

3. The image stabilization apparatus, according to claim 1, wherein the movement restrictor includes an equalizing portion configured to give a reaction force in a direction different from the predetermined direction to the restricted rolling member when the restricted rolling member contacts the end portion.

4. The image stabilization apparatus, according to claim 1, wherein the end portion of the movement restrictor in the predetermined direction includes a slope inclined to the predetermined direction.

5. The image stabilization apparatus according to claim 1, wherein the end portion of the movement restrictor in the predetermined direction includes a first slope portion formed along a first oblique line inclined by a first angle to the predetermined direction, and a second slope portion formed along a second oblique line inclined by a second angle different from the first angle to the predetermined direction, and wherein the following conditional expression is satisfied:

$$60 \leq A \leq 120$$

where A (degrees) is an angle at which the first oblique line and the second oblique line intersect with each other.

6. The image stabilization apparatus according to claim 1, wherein the end portion of the movement restrictor in the predetermined direction includes a first slope portion formed along a first oblique line inclined by a first angle to the predetermined direction and a second slope portion formed along a second oblique line inclined by a second angle different from the first angle to the predetermined direction, wherein the first slope portion and the second slope portion have lengths equal to each other on the plane perpendicular to the optical axis, and wherein the following conditional expression is satisfied:

$$0.25 \leq D1/D2 < 1$$

where D1 (mm) is a length of the first slope portion or the second slope portion on the plane perpendicular to the optical axis, and D2 (mm) is a diameter of the restricted rolling member.

7. The image stabilization apparatus according to claim 1, wherein the movement restrictor includes a first surface on which the restricted rolling member rolls and a second surface perpendicular to the first surface, and
wherein a length of the second surface in the optical axis direction is shorter than a radius of the restricted rolling member.

8. A lens apparatus comprising:
a focus lens; and
an image stabilization apparatus,
wherein the image stabilization apparatus includes:
a fixed member;
a lens;
a movable member configured to hold the lens and capable of moving relative to the fixed member on a plane perpendicular to an optical axis of the lens;
a guide member movable relative to the fixed member on the plane perpendicular to the optical axis and configured to guide the movable member while suppressing the movable member from rotating relative to the fixed member on the plane perpendicular to the optical axis;
a first rolling member held and configured to roll between the fixed member and the guide member;
a second rolling member held and configured to roll between the guide member and the movable member; and
a third rolling member held and configured to roll between the fixed member and the movable member,
wherein at least one of the fixed member, the movable member, and the guide member includes a movement restrictor configured to restrict a moving range of a restricted rolling member as at least one of the first to third rolling members in a predetermined direction on the plane perpendicular to the optical axis, and
wherein the movement restrictor is formed such that as the restricted rolling member approaches to an end portion of the moving range, a center of the restricted rolling member approaches to a centerline in a width direction perpendicular to the predetermined direction of the movement restrictor.

9. A camera system comprising:
a lens apparatus; and
an image sensor configured to photoelectrically convert an object image formed via the lens apparatus,
wherein the lens apparatus includes a focus lens and an image stabilization apparatus,
wherein the image stabilization apparatus includes:
a fixed member;
a lens;
a movable member configured to hold the lens and capable of moving relative to the fixed member on a plane perpendicular to an optical axis of the lens;
a guide member movable relative to the fixed member on the plane perpendicular to the optical axis and configured to guide the movable member while suppressing the movable member from rotating relative to the fixed member on the plane perpendicular to the optical axis;
a first rolling member held and configured to roll between the fixed member and the guide member;
a second rolling member held and configured to roll between the guide member and the movable member; and
a third rolling member held and configured to roll between the fixed member and the movable member,
wherein at least one of the fixed member, the movable member, and the guide member includes a movement restrictor configured to restrict a moving range of a restricted rolling member as at least one of the first to third rolling members in a predetermined direction on the plane perpendicular to the optical axis, and
wherein the movement restrictor is formed such that as the restricted rolling member approaches to an end portion of the moving range, a center of the restricted rolling member approaches to a centerline in a width direction perpendicular to the predetermined direction of the movement restrictor.

* * * * *